United States Patent [19]
Christie

[11] Patent Number: 6,154,818
[45] Date of Patent: Nov. 28, 2000

[54] SYSTEM AND METHOD OF CONTROLLING ACCESS TO PRIVILEGE PARTITIONED ADDRESS SPACE FOR A MODEL SPECIFIC REGISTER FILE

[75] Inventor: David S. Christie, Austin, Tex.

[73] Assignee: Advanced Micro Devices, Inc., Sunnyvale, Calif.

[21] Appl. No.: 08/975,027

[22] Filed: Nov. 20, 1997

[51] Int. Cl.[7] .............................. G06F 12/14; G06F 13/00
[52] U.S. Cl. ......................... 711/163; 711/152; 711/153; 711/170; 711/173; 710/130
[58] Field of Search .................................. 711/152, 163, 711/170, 153, 173; 712/200; 710/130

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 711/2 |
| 4,807,115 | 2/1989 | Torng | 712/215 |
| 4,858,105 | 8/1989 | Kuriyama et al. | 712/235 |
| 4,928,223 | 5/1990 | Dao et al. | 712/247 |
| 5,053,631 | 10/1991 | Perlman et al. | 708/508 |
| 5,058,048 | 10/1991 | Gupta et al. | 708/508 |
| 5,129,067 | 7/1992 | Johnson | 712/213 |
| 5,136,697 | 8/1992 | Johnson | 712/239 |
| 5,226,126 | 7/1993 | McFarland et al. | 712/218 |
| 5,226,130 | 7/1993 | Favor et al. | 712/238 |
| 5,396,609 | 3/1995 | Schmidt et al. | 711/152 |
| 5,623,636 | 4/1997 | Revilla et al. | 711/163 |
| 5,649,159 | 7/1997 | Le et al. | 711/163 |
| 5,657,475 | 8/1997 | Gillespie et al. | 711/163 |
| 5,737,765 | 4/1998 | Shigeeda | 711/163 |
| 5,848,435 | 12/1998 | Brant et al. | 711/152 |

FOREIGN PATENT DOCUMENTS

| | | |
|---|---|---|
| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel 1994 Pentium Processor Family User's Manual, vol. 1: Pentium Processor Family Data Book, pp. 2–1 through 2–4.
Michael Slater, "AMD's K5 Designed to Outrun Pentium," Microprocessor Report, vol. 8, No. 14, Oct. 24, 1994, pp. 1, 6–11.
Sebastian Rupley and John Clyman, "P6: The Next Step?," PC Magazine, Sep. 12, 1995, pp. 102–137.
Tom R. Halfhill, "AMD K6 Takes On Intel P6," BYTE, Jan. 1996, pp. 67–72.

*Primary Examiner*—Glenn Gossage
*Attorney, Agent, or Firm*—Conley, Rose & Tayon, PC; B. Noel Kivlin; Lawrence J. Merkel

[57] ABSTRACT

A system and method for controlling access to privilege partitioned address space for a model specific register file. A superscalar microprocessor includes a plurality of model specific registers (MSRs). MSRs differ between various implementations of a microprocessor architecture. The MSRs are allocated to access regions within a MSR file. Each access region of the MSR file is assigned access attributes. The MSRs are allocated such that the access region and the access attributes of the MSRs are defined by the address of the MSRs. Access to the MSRs is controlled by comparing the address of the MSR to the current privilege level of the microprocessor. In one embodiment, a validity check circuit is used to control access to the MSRs. If an access is attempted to a MSR that cannot be accessed at the current microprocessor privilege level, access to the register is denied and an exception is generated. In one embodiment, an address checker may be used to verify whether a MSR address is within a valid range. The MSR file may be divided into regions, with access granted based on a microprocessor being in a supervisory mode or a user mode.

32 Claims, 7 Drawing Sheets

SYSTEM AND METHOD OF CONTROLLING ACCESS TO PRIVILEGE PARTITIONED ADDRESS SPACE FOR A MODEL SPECIFIC REGISTER FILE

BACKGROUND OF THE INVENTION

1. Field of the Invention

This invention relates to the field of microprocessors and, more particularly, to model specific registers within microprocessors.

2. Description of the Relevant Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Microprocessor designers often design their products in accordance with the x86 microprocessor architecture in order to take advantage of its widespread acceptance in the computer industry. Because the x86 microprocessor architecture is pervasive, many computer programs are written in accordance with the architecture. X86 compatible microprocessors may execute these computer programs, thereby becoming more attractive to computer system designers who desire x86-capable computer systems. Such computer systems are often well received within the industry due to the wide range of available computer programs.

The x86 microprocessor architecture includes a plurality of architectural registers. Architectural registers are registers that are inherent to a microprocessor design. For example, in the x86 architecture eight general registers and six segment registers are defined. Each implementation of an x86 microprocessor includes these architectural registers. In addition to the architectural registers, the x86 architecture defines a set of model specific registers (MSRs). The MSRs are used to define control and status registers that may differ between various implementations of an x86 microprocessor. For example, a Time Stamp Counter is not defined as part of the x86 architecture. Some implementations of an x86 microprocessor, however, include a Time Stamp Counter as an MSR.

Access to the MSRs is accomplished via specific MSR instructions. The read MSR (RDMSR) and write MSR (WRMSR) instructions are defined to access the model specific registers. These MSR instructions are defined to be privileged instructions. In other words, the MSR instructions can only be used when the privilege level of the microprocessor is set to a specific level. This prevents non-privileged software, such as, application programs, from accessing or modifying to MSRs.

Privilege levels are a protection mechanism of the x86 architecture. The x86 architecture provides four different privilege levels. Generally speaking, a privilege level is assigned to each segment of memory. Normally, the current privilege level (CPL) of the microprocessor is the privilege level of the segment of memory from which instructions are being fetched. Additionally, instructions can be designated as privileged. A general protection exception is generated if a program attempts to access a segment of a memory using a lower privilege level than the privilege level applied to that segment, or a privileged instruction is attempted to be executed from a non-privileged area of memory.

Privilege levels can be used to protect critical areas of memory. For example, operating systems may be stored in areas of memory assigned high privilege levels and application programs stored in areas of memory assigned lower privilege levels. When an application program is running, the CPL is low and areas of memory assigned high privilege levels cannot be accessed. In this manner, errors, or bugs, in an application program cannot access or corrupt operating system software which is stored in high privilege areas of memory.

In the x86 architecture, four privilege levels are defined. The higher the privilege level number, the lesser the privileges. In other words, privilege level 0 (CPLO) is the highest privilege level and privilege level 3 is the lowest privilege level. When the processor is in privilege level 3, only access to memory designated as privilege level 3 is permitted. When the processor is in privilege level 2, access is permitted to memory designated as privilege level 2 or privilege level 3. Similarly, when the processor is in privilege level 1, access to memory designated as privilege levels 1, 2 or 3 is permitted. When the processor is in privilege level 0, access to all memory is permitted.

As discussed above, the RDMSR and WRMSR instructions are typically defined to be privileged instructions. For example, these instructions may only be used when the privilege level of the processor is 0. Therefore, the model specific registers are only accessible to programs stored in areas of memory with a privilege level of 0. Unfortunately, there is a need for certain registers to be accessible to programs with lower privilege levels. Access to the model specific registers by non-privileged programs has been accommodated by adding new non-privileged instructions that are defined to access a specific MSR. For example, the Read Time Stamp Counter instruction allows non-privileged privileged access to the Time Stamp Counter. Unfortunately, this method of singling out certain MSRs via separate instructions is an expensive use of scarce opcode encodings.

SUMMARY OF THE INVENTION

The problems outlined above are in large part solved by a privilege partitioned address space for model specific registers. The model specific registers are allocated to a region of an MSR address space according to the desired accessing attributes for accessing the model specific registers. Access attributes are assigned to each region of the MSR. Access attributes include among other things, the desired privilege level for accessing MSR. The MSRs are allocated among the MSR address space such that an MSR is assigned to a region with the desired access attributes of that MSR. The address of an MSR identifies the region of the MSR address space to which the MSR is allocated and, therefore, also identifies the access attributes of the MSR. The WRMSR and RDMSR instructions become non-privileged instructions. The address of the MSR accessed by an MSR instruction determines the access attributes of that MSR. In this manner, access to non-privileged MSRs can be accommodated without adding new instructions, and access to privileged MSRs is still restricted.

Broadly speaking, the present invention contemplates a register file including a plurality of access regions and a validity check circuit. The plurality of access regions include one or more registers and each of the access regions is assigned a privilege level. The validity check circuit is coupled to the plurality of access regions and is configured to permit access to a register of an access region if a privilege level input correlates to the privilege level assigned to the access region of the register.

The present invention further contemplates a method of controlling access to a register file including the steps of allocating a plurality of registers to a plurality of access regions of the register file, wherein each of the access regions is assigned a privilege level; receiving a privilege level input; receiving an address of a register, wherein the address identifies an access region to which the register is allocated; comparing the privilege level assigned to the access region identified by the address of the register to the privilege level input; and accessing the register if the privilege level assigned to the access region identified by the address of the register correlates to the privilege level input.

The present invention still further contemplates a computer system including a microprocessor, a bus bridge coupled to the microprocessor, a main memory coupled to the microprocessor, and an input/output device coupled to the bus bridge. The microprocessor includes a plurality of access regions and a validity check circuit. The plurality of access regions include one or more registers and each of the access regions is assigned a privilege level. The validity check circuit is coupled to the plurality of access regions and is configured to permit access to a register of an access region if a privilege level input correlates to the privilege level assigned to the access region of the register.

BRIEF DESCRIPTION OF THE DRAWINGS

Other objects and advantages of the invention will become apparent upon reading the following detailed description and upon reference to the accompanying drawings in which.

Figure 1:
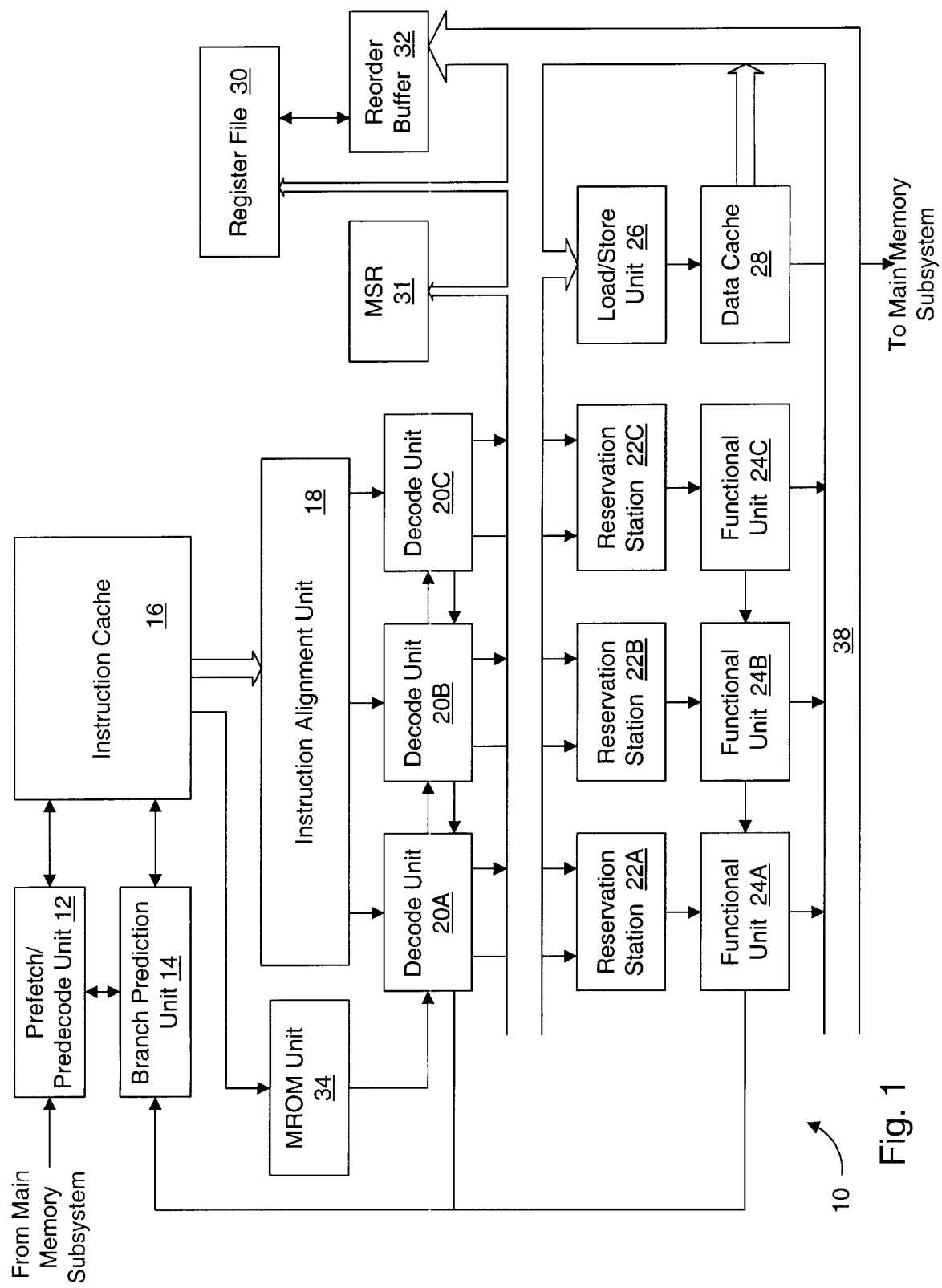
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a model specific register unit 31, a reorder buffer 32, and an microcode read-only memory (MROM) unit 34 unit 34. Blocks referred to herein with a reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30, model specific register unit 31, and reorder buffer 32. Functional units 24 are coupled to load/store unit 26, register file 30, model specific register unit 31, and reorder buffer 32 as well. Data cache 28 is coupled to load/store unit 26 and to the main memory subsystem. Finally, MROM unit 34 is coupled to decode units 20.

Generally speaking, model specific registers are registers that differ between various implementations of an x86 microprocessor architecture. The MSR address space is divided into a plurality of access regions. Access attributes are associated with each region of the MSR address space. MSRs are allocated among the regions of the MSR address space according to the desired access attributes of the MSRs. For example, an MSR that may only be accessed when a processor is in a high privilege level is allocated to one region of the MSR address space, and an MSR that may be accessed at a low privilege level is allocated to a different region of the MSR address space. The address of the MSR identifies the region of the MSR address space to which an MSR is allocated. Because each region is assigned access attributes, the address also identifies the access attributes of the register. The MSR address is compared to the current privilege level of the processor to determine whether access should be granted to that MSR at the current priority level.

Microprocessor 10 is configured to align instructions from instruction cache 16 to decode units 20 using instruction alignment unit 18. Instructions are fetched as an aligned plurality of bytes from a cache line within instruction cache 16. Instructions of interest may be stored beginning at any arbitrary byte within the fetched bytes. For example, a branch instruction may be executed having a target address which lies within a cache line. The instructions of interest therefore begin at the byte identified by the target address of the branch instruction. From the instruction bytes fetched, instruction alignment unit 18 identifies the instructions to be executed. Instruction alignment unit 18 conveys the instructions, in predicted program order, to decode units 20 for decode and execution.

Instruction alignment unit 18 includes a byte queue configured to store instruction bytes. An instruction scanning unit within instruction cache 16 separates the instructions fetched into instruction blocks. Each instruction block comprises a predefined number of instruction bytes. The instruction scanning unit identifies up to a predefined maximum number of instructions within the instruction block. Instruction identification information for each of the identified instructions is conveyed to instruction alignment unit 18 and is stored in the byte queue. The instruction identification information includes an indication of the validity of the instruction, as well as indications of the start and end of the instruction within the predefined number of instruction bytes. In one embodiment, the predefined number of instruction bytes comprises eight instruction bytes stored in contiguous main memory storage locations. The eight instruction bytes are aligned to an eight byte boundary (i.e. the least significant three bits of the address of the first of the contiguous bytes are 0). If more than the maximum number of instructions are contained within a particular predefined number of instruction bytes, the instruction bytes are scanned again during a subsequent clock cycle. The same instruction bytes are conveyed as another instruction block, with the additional instructions within the instruction bytes identified by the accompanying instruction identification information. Therefore, an instruction block may be defined as up to a predefined maximum number of instructions contained within a predefined number of instruction bytes.

The byte queue stores each instruction block and corresponding instruction identification information within a subqueue defined therein. The subqueues include a position for each possible valid instruction within the instruction block. The positions store instruction identification information and are maintained such that the instruction identification information for the first valid instruction within the subqueue is stored in a first position within the subqueue, instruction identification information regarding the second valid instruction (in program order) is stored in a second position within the subqueue, etc. When instructions within the subqueue are dispatched, instruction identification information corresponding to subsequent instructions are shifted within the positions of the subqueue such that the first of the remaining instructions is stored in the first position. Advantageously, instruction alignment unit 18 may only consider the instruction information stored in the first position of each subqueue to detect the instruction to be dispatched to decode unit 20A. Similarly, only the second position of the first subqueue (the subqueue storing instructions prior to the instructions stored in the other subqueues in program order) may be considered for dispatch of instructions to decode unit 20B. By managing the subqueues in this manner, logic for selecting and aligning instructions may be simplified. Fewer cascaded levels of logic may be employed for performing the selection and alignment process, allowing for high frequency implementation of microprocessor 10.

Because instructions are variable length, an instruction may begin within a particular instruction block but end in another instruction block. Instructions beginning within a particular instruction block and ending in another instruction block are referred to as "overflow instructions". The subqueue storing the instruction block within which an overflow instruction begins uses the last position to store the overflow instruction's identification information. Unlike the other positions, the instruction identification information of the last position is not shifted from the last position when an overflow instruction is stored therein. Advantageously, instruction alignment unit 18 need only search the last position of a particular subqueue to identify an instruction overflowing from one subqueue to another.

As used herein, the term queue refers to a storage device for storing a plurality of data items. The data items are stored with an ordered relationship between them. For example, the data items of the byte queue are instructions. The ordered relationship between the instructions is the program order of the instructions. Data items are removed from the queue according to the ordered relationship in a first in-first out (FIFO) fashion. Additionally, the term shifting is used to refer to movement of data items within the queue. When a data item is shifted from a first storage location to a second storage location, the data item is copied from the first storage location to the second storage location and invalidated in the second storage location. The invalidation may occur by shifting yet another data item into the second storage location, or by resetting a valid indication in the second storage location.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. For this embodiment of microprocessor 10, instructions which may be directly decoded by decode units 20 are referred to as "fast path" instructions. Fast path instructions may be an example of directly-decoded instructions for this embodiment. The remaining x86 instructions are referred to as MROM instructions, according to one embodiment. For this embodiment, MROM instructions are an example of microcode instructions.

For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

| | |
|---|---|
| Start bits | 10000 |
| End bits | 00001 |
| Functional bits | 11000 |

MROM instructions are instructions which are determined to be too complex for decoding by decode units 20. MROM instructions are executed by accessing MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order. As used herein, the term "program order" refers to the order of the instructions as coded in the original sequence in memory. The program order of instructions is the order in which the instructions would be executed upon a microprocessor which fetches, decodes, executes, and writes the result of a particular instruction prior to fetching another instruction. Additionally, the term "dispatch" is used to refer to conveyance of an instruction to an issue position which is to execute the instruction. Issue positions may also dispatch load/store memory operations to load/store unit 26. As used herein, the "term issue position" refers to logic circuitry configured to receive an instruction and to execute that instruction.

Decode units 20 are configured to decode instructions received from instruction alignment unit 18. Register operand information is detected and routed to register file 30, MSR unit 31, and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data)

for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B, and issue position 2 is formed by reservation station 22C and functional unit 24C. As used herein, the term "issue position" refers to logic circuitry configured to receive an instruction and to execute that instruction. Once the instruction enters the issue position, it remains in that issue position until the execution of the instruction is completed.

Upon decode of a particular instruction, if a required operand is a general register location, register address information is routed to reorder buffer 32 and register file 30 simultaneously. Those of skill in the art will appreciate that the x86 register file includes eight 32 bit general registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by other blocks of microprocessor 10. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value In the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated similar to load/store unit 26 in that any of decode units 20 may dispatch instructions to the floating point unit. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a general register value is being updated and to load/store unit 26 if the contents of a memory location are changed. If the result is to be stored in a general register, reorder buffer 32 stores the result in the location reserved for the value of the register when the instruction was decoded.

A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
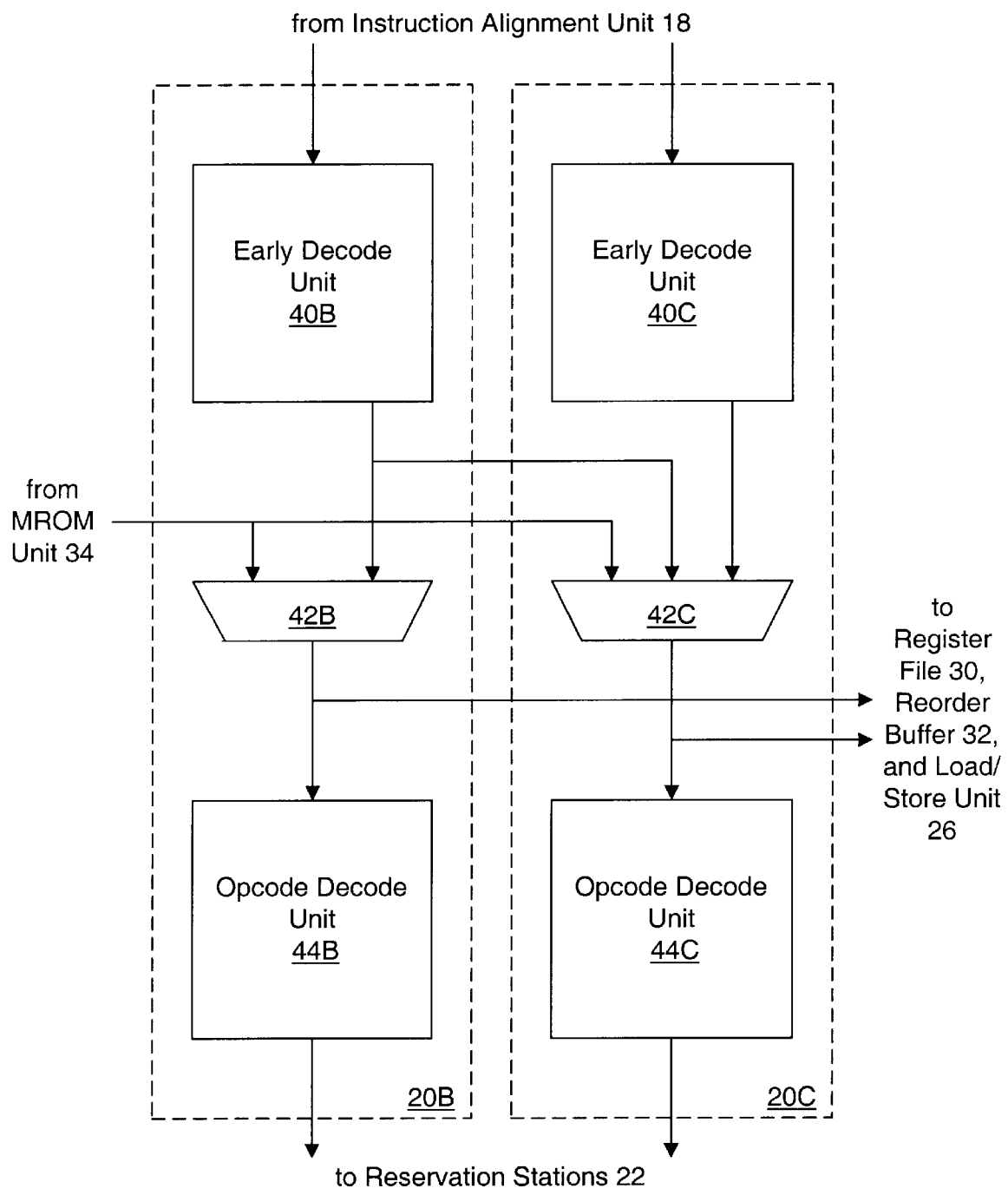
FIG. 2 is a block diagram of one embodiment of two of the decode units shown in FIG. 1.

Turning now to FIG. 2, a block diagram of one embodiment of decode units 20B and 20C are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexer 42B, and opcode decode unit 44B. Similarly, decode unit 20C includes early decode unit 40C, multiplexer 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexer 42B is included for selecting between the instructions provided by MROM unit 34 and by early decode unit 40B. During times in which MROM unit 34 is dispatching instructions, multiplexer 42B selects instructions provided by MROM unit 34. At other times, multiplexer 42B selects instructions provided by early decode unit 40B. Similarly, multiplexer 42C selects between instructions provided by MROM unit 34, early decode unit 40B, and early decode unit 40C. The instruction from MROM unit 34 is selected during times in which MROM unit 34 is dispatching instructions. During times in which early decode unit 40B detects a double dispatch instruction, the instruction from early decode unit 40B is selected by multiplexer 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information; and
(v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexers 42 are routed to register file 30 and reorder buffer 32. Operand values or tags may thereby be routed to reservation stations 22. Additionally, memory operands are detected by early decode units 40. Therefore, the outputs of multiplexers 42 are routed to load/store unit 26. Memory operations corresponding to instructions having memory operands are stored by load/store unit 26.

Figure 3A:
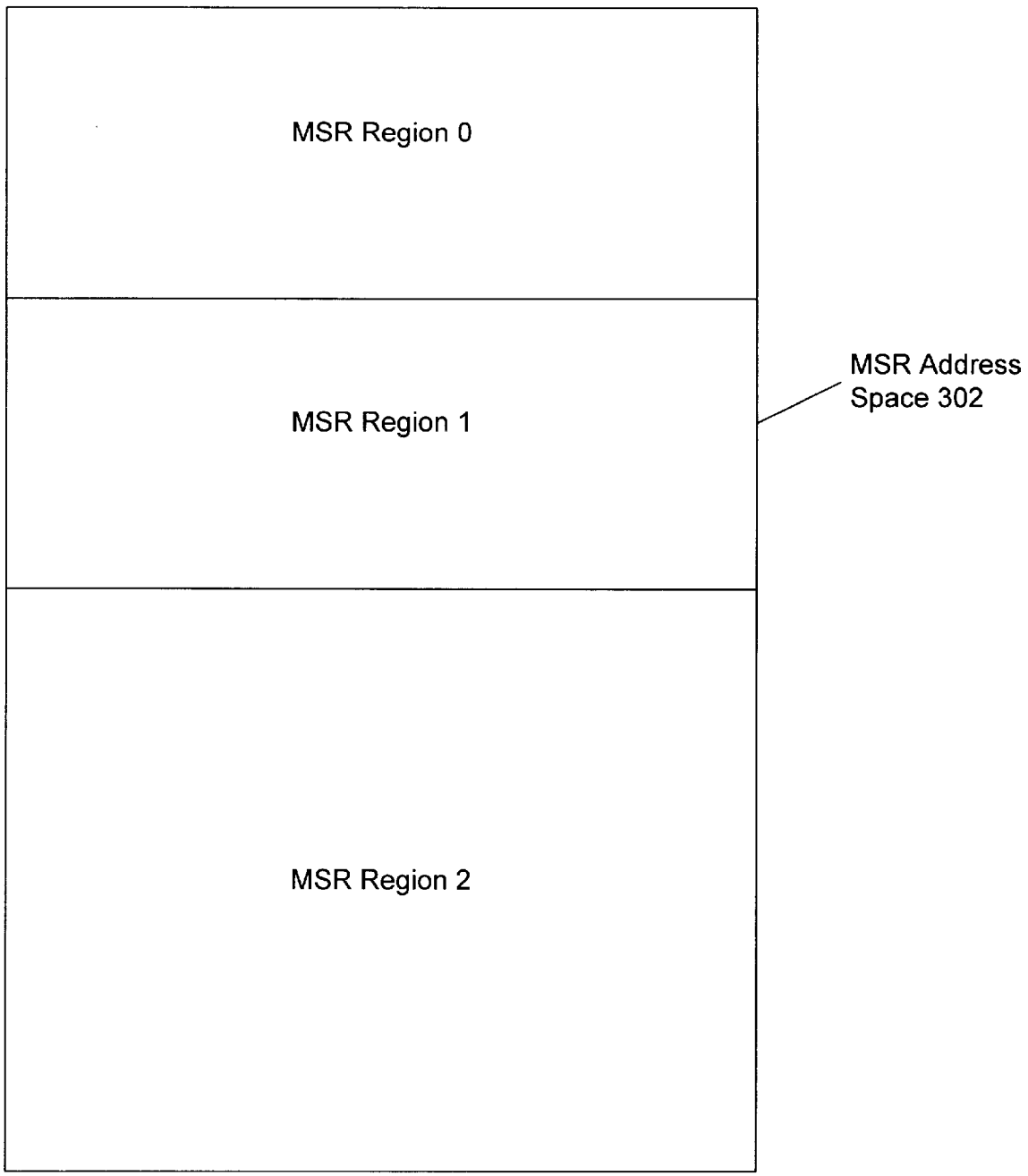
FIG. 3A is a diagram of one embodiment of an MSR address space.

Turning now to FIG. 3A a diagram of MSR address space 302 is shown. In one embodiment, the MSR address space is very large. In one particular embodiment, an MSR address is 32 bits. Accordingly, in this embodiment, MSR address space 302 includes over 4 billion addresses. The number of MSRs actually implemented in a microprocessor architecture is typically a small subset of the MSR address space. For example, a particular microprocessor may implement 256 MSRs. The addresses of the implemented MSRs may be distributed throughout MSR address space 302.

MSR address space 302 includes a plurality of MSR regions. Generally speaking, an MSR region, or access region, is a portion of MSR address space 302. In the illustrated embodiment, MSR address space 302 includes three MSR regions. Each region of MSR address space 302 has specific access attributes associated with the region. The implemented MSRs are allocated among the regions of MSR address space 302. By allocating an MSR to a region of MSR address space 302 with the desired access attributes, access to the MSR can be controlled. Each region of MSR address space 302 is located in a unique address space of MSR address space 302. Therefore, the address of an MSR indicates the region to which an MSR is allocated. Because each region has specific address attributes, the address also identifies access attributes of the MSR. Access attributes include, among other things, the desired privilege level for accessing the MSR. For example, the access attributes may further include read or write limitations.

In one embodiment, MSR address space 302 is divided into three access regions. In one particular embodiment, MSRs allocated to MSR Region 0 are only accessed when microprocessor 10 is in a supervisory mode. Generally speaking, "supervisory mode" is a highly privileged mode typically used for operating systems. Generally speaking, "user mode" is a less privileged mode typically used for applications. In one embodiment, supervisory mode is defined as a privilege level of 0, 1 or 2. MSRs allocated to MSR Region 2 may be accessed when the privilege level of microprocessor 10 is in either a supervisory or user mode. In one embodiment, user mode is defined as a privilege level of 3. MSRs allocated to MSR Region 1 may be read when microprocessor 10 is in either a supervisory or user mode, but can be written only when microprocessor 10 is in a supervisory mode. In other embodiments, MSR address space 302 may be divided into different MSR regions. Additionally, in other embodiments the access attributes of the MSR regions may be defined differently. For example, the access attributes of an MSR region may be defined to only allow access to MSRs in that region when the privilege level of microprocessor 10 is 0.

Each region of MSR address space 302 is allocated to a particular address space of MSR address space 302. In one embodiment, MSR address space is divided into contiguous regions. In this embodiment, the most significant bit(s) of an MSR address define(s) the MSR region to which an MSR is allocated. Because each region has access attributes associated with it, the most significant address bit(s) of the MSR also define(s) the access attributes for that MSR. In one particular embodiment, the two most significant address bits of the MSR define the access attributes of the MSR. In one particular embodiment, MSR Region 0 is allocated the contiguous address block with the lowest addresses. The MSRs in Region 0 can only be accessed when microprocessor 10 is in a supervisory mode. The MSRs that may be accessed when microprocessor 10 is in a supervisory or user mode are allocated to MSR Region 2. MSR Region 2 is allocated to the contiguous data block with the highest addresses. MSR Region 1 is allocated to a contiguous data block located between MSR Region 0 and MSR Region 2. In one embodiment, the MSRs in MSR Region 1 can be read in either supervisory or user mode, but can be written only in supervisory mode. The table below illustrates one mapping of MSR address bits to MSR regions and the associated access attributes of those regions.

| | MSR address bits (31:30) | Write access allowed by | Read access allowed by |
|---|---|---|---|
| MSR Region 0 | 00 | Supervisor only | Supervisor only |
| MSR Region 1 | 01 | Supervisor only | Supervisor and user |
| MSR Region 2 | 1x | Supervisor and user | Supervisor and user |

In this embodiment, MSR Region 2 is twice the size of MSR Region 0 and MSR Region 1. The above mapping of MSR regions and access attributes to MSR regions is for illustrative purposes only. In other embodiments, the MSR regions are mapped to different portions of MSR address space 302 and the access attributes of an MSR region are different. MSR address bits (31:30) represents the two most significant bits of a 32-bit MSR address.

Figure 3B:
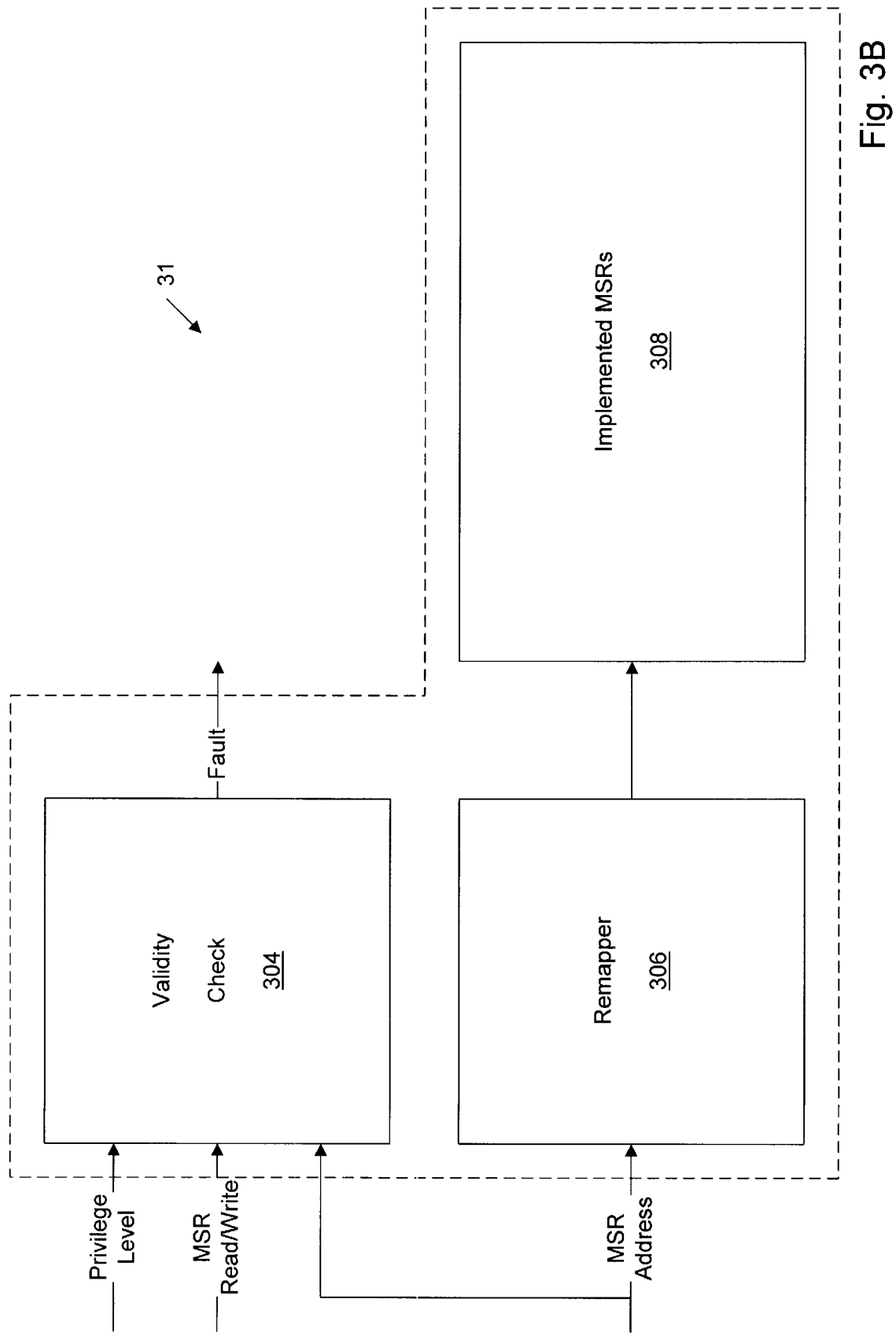
FIG. 3B is a block diagram of one embodiment of the circuitry for accessing model specific registers.

Turning now to FIG. 3B, a block diagram of the circuitry for accessing model specific registers is shown. The circuitry shown here is located within MSR unit 31 of FIG. 1. The circuitry includes a validity check circuit 304, remapper 306 and implemented MSRs 308. Implemented MSRs 308 represent the MSRs implemented in a particular microprocessor. As noted above, implemented MSRs 308 are typically a small subset of the entire MSR address space. Although implemented MSRs 308 are depicted as a group of registers, the implemented MSRs are typically distributed throughout the microprocessor.

Remapper 306 is a circuit that maps an MSR address to a local address of an implemented MSR. As discussed above, the number of implemented MSRs is a small subset of the total MSR address space and the implemented MSRs are typically distributed throughout the microprocessor. Accordingly, in one embodiment, to reduce the number of address lines routed to identify an MSRs, each MSR is given a local address requiring less bits. For example, if a particular microprocessor implements 256 MSRs, the local address may be 8 bits. Therefore, 8 address lines of the local address rather than 32 address lines of the MSR address may be routed to the distributed MSRs. Remapper 306 maps the MSR addresses to the local addresses of the implemented MSRs.

Generally speaking, validity check circuit 304 is a logical circuit that compares the address of MSRs being accessed to the current privilege level of the microprocessor. If the MSR address is located in an MSR region permitted to be accessed at the current privilege level, then validity check circuit 304 permits access to the MSR. If, however, the MSR address is located in an MSR region that is not permitted to be accessed at the current privilege level, then validity check circuit 304 asserts a fault signal. In one embodiment, the fault signal is used to generate an exception. In one particular embodiment, the fault signal is input to a reorder buffer, which handles exceptions.

In one embodiment, validity check circuit 304 also receives an MSR read/write signal. In this embodiment, validity check circuit 304 is capable of permitting access to certain MSRs for read or write access only. For example, an access attribute of an MSR region may permit read access to the MSRs allocated to that region whether the microprocessor is in supervisory or user mode. The same region may, however, only allow write access to the MSRs allocated to that region when the microprocessor is in a supervisory mode. In this embodiment, validity check circuit 304 compares the MSR address to the current privilege level and the MSR read/write input.

Figure 4:
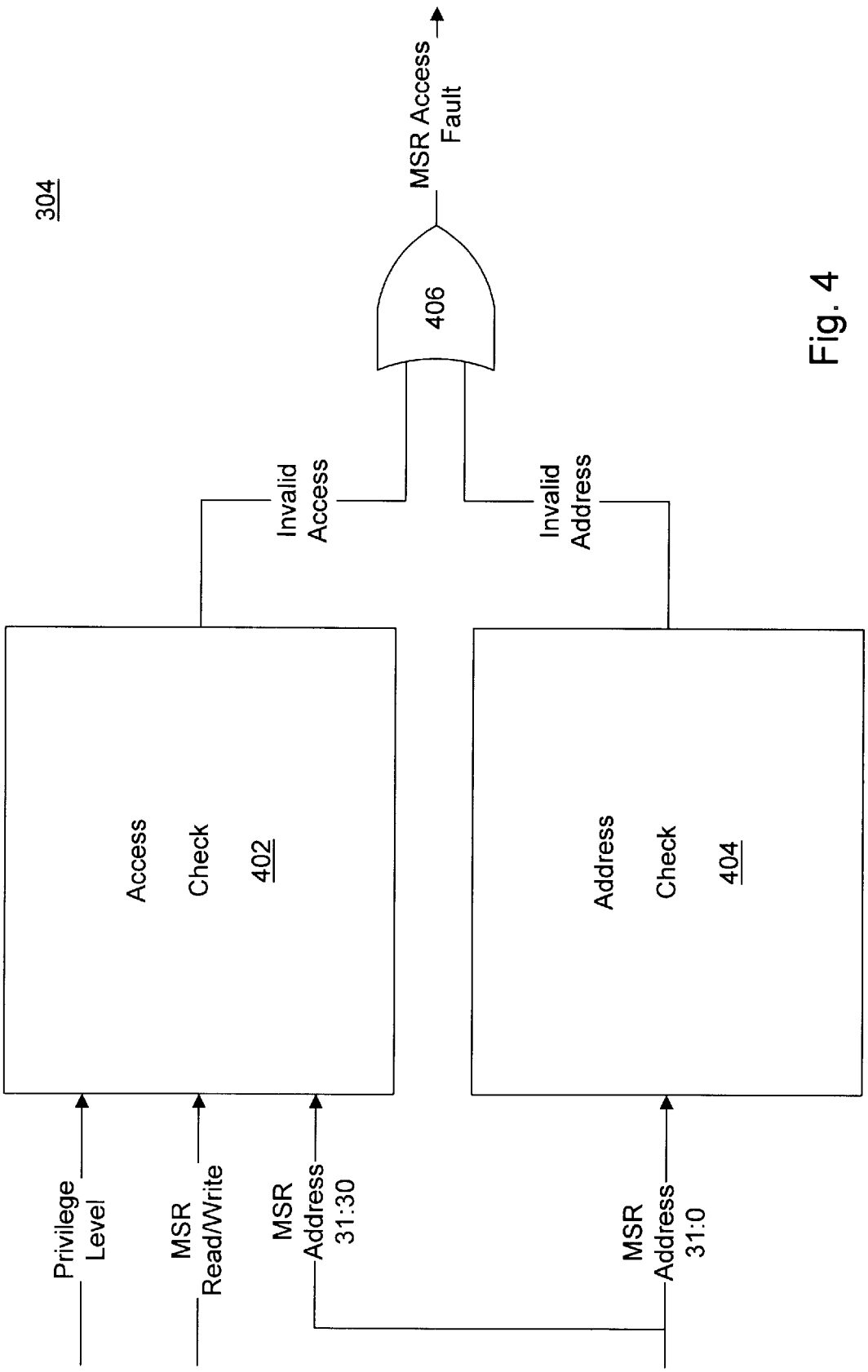
FIG. 4 is a block diagram illustrating one embodiment of a validity check circuit shown in FIG. 3.

Turning now to FIG. 4, a block diagram of one embodiment of validity check circuit 304 is shown. Validity check circuit 304 includes an access check circuit 402, an address check circuit 404, and an OR gate 406. Access check circuit 402 receives a privilege level input, an MSR read/write input, and an MSR address signal. Generally speaking, a privilege level input is an input for receiving a signal indicative of a privilege level of an associated circuit. Access check circuit 402 outputs an invalid access signal. Address check 404 receives an MSR address signal and outputs an invalid address signal. OR gate 406 receives the invalid access signal and the invalid address signal and generates an MSR access fault signal.

Access check circuit 402 compares the privilege level input and the MSR read/write input to the address of the MSR being accessed. In one embodiment, the two most significant bits of the MSR address indicate the access attributes of the MSR. In this embodiment, address check circuit 402 compares the two most significant bits of the MSR address to the privilege level and the MSR read/write signal. In one particular embodiment, access is granted to an MSR with the two most significant address bits of "00" only if the microprocessor is in supervisory mode. Read access to an MSR with the two most significant address bits of "01" is granted regardless of the privilege level of the microprocessor, i.e., whether the microprocessor is in supervisory or user mode. Write access, however, to an MSR with the two most significant address bits of "01" is only granted if the microprocessor is in supervisory mode. Access is granted to MSRs with a most significant address bit of "1" regardless of the state of the privilege level or the MSR read/write signal. In other embodiments, address check circuit 402 monitors other address lines. In other embodiments, access check circuit 402 uses other mappings to determine whether to grant or deny access to an MSR. If access check circuit 402 detects an improper access to an MSR, access check circuit 402 asserts an invalid access signal.

Generally speaking, address check circuit 404 is a circuit that compares an MSR address to a valid address range, or MSR address range. The MSR address range defines the valid range of addresses for MSRs. In one embodiment, the MSR address range is a 32-bit contiguous address range. If an MSR address is not within the MSR address range, address check circuit 404 generates an invalid address signal.

OR gate 406 receives the invalid access signal and the invalid address signal. If either the invalid access signal or invalid address signal is asserted, OR gate 406 asserts an MSR access fault signal. If an MSR access fault is detected, access to MSR register file 31 (of FIG. 1) is denied. In one embodiment, an MSR access fault generates an exception within microprocessor 10.

Figure 5:
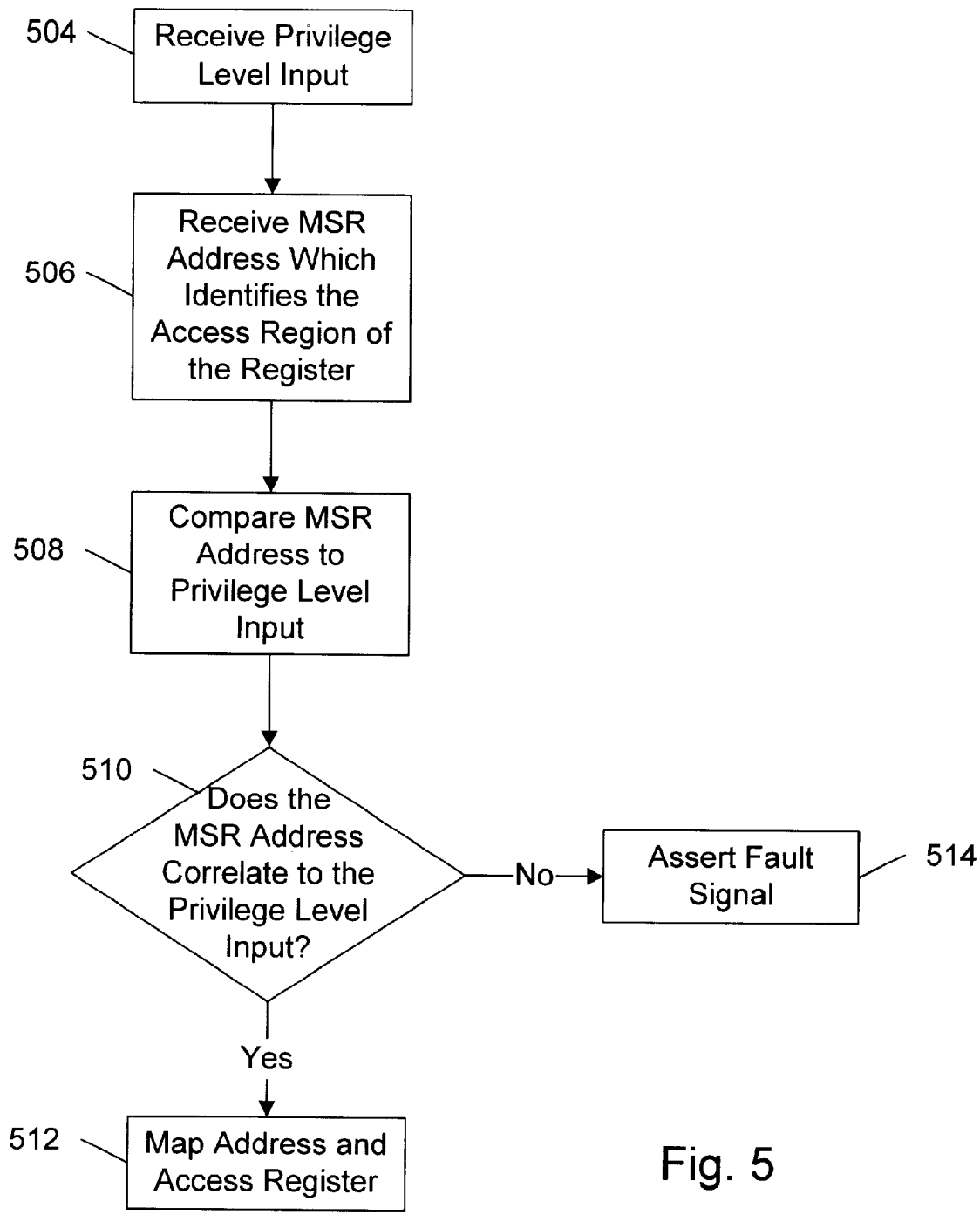
FIG. 5 is a flow chart illustrating the operation of one embodiment of a model specific register unit.

FIG. 5 is a flow chart illustrating the accessing of model specific registers. Implemented MSRs are allocated to access regions in accordance with an architectural specification. Access attributes are assigned to each access region. Local addresses are allocated to each MSR. In a step 504, a privilege level input is received. In one embodiment, the privilege level input indicates a current privilege level of microprocessor 10. In a step 506, a MSR address is received. The MSR address identifies the access region of the register. In a step 508, the MSR address is compared to the privilege level input. In a decisional step 510, it is determined whether the MSR address correlates to the privilege level input. If the MSR address correlates to the privilege level input, then in a step 512 the MSR address is mapped to a local address and the register is accessed. If in decisional step 510 the register address does not correlate to the privilege level input, then in a step 514, a fault signal is asserted.

Figure 6:
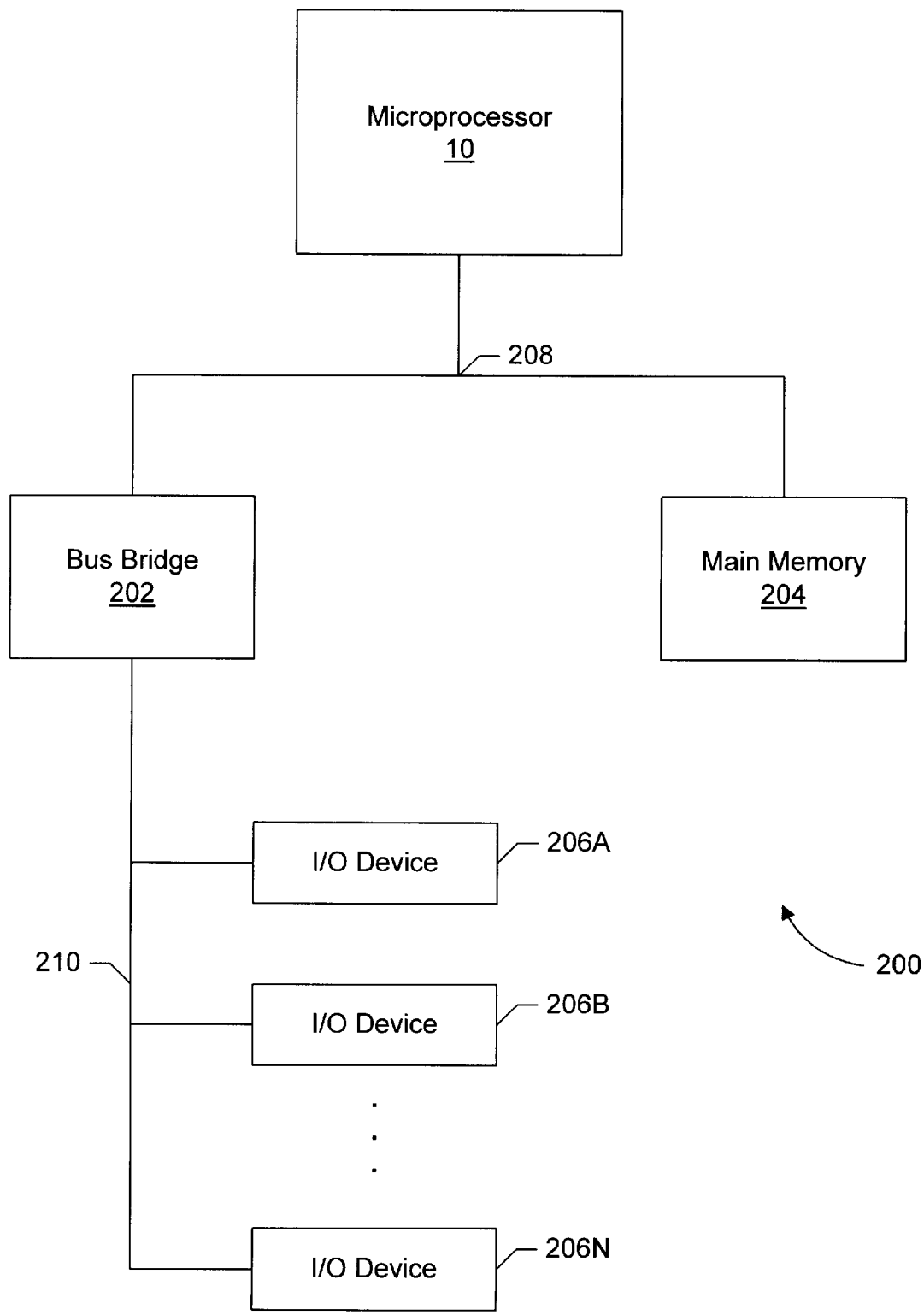
FIG. 6 is a block diagram of a computer system including the microprocessor shown in FIG. 1.

Turning now to FIG. 6, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 6 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

Although the x86 microprocessor architecture and instruction set have been used as a specific example herein, it is noted that the apparatus and method described herein may be applicable to any microprocessor which employs model specific registers. Such embodiments are contemplated.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical 0 value or, conversely, when it conveys a logical 1 value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, 1 of the n-bit encodings may indicate that the value is invalid. Setting the value to an invalid encoding causes the value to be discarded. Additionally, an n-bit value may include a valid bit indicative, when set, that the n-bit value is valid. Resetting the valid bit may comprise discarding the value. Other methods of discarding a value may be used as well.

Numerous variations and modifications will become apparent to those skilled in the art once the above disclosure is fully appreciated. It is intended that the following claims be interpreted to embrace all such variations and modifications.

What is claimed is:

1. A processor including an address space, the processor comprising:
   one or more registers wherein each of said one or more registers is assigned to one of a plurality of access regions and each of said plurality of access regions is assigned a privilege level;
   a validity check circuit configured to receive an address of a first register of said one or more registers, wherein said validity check circuit is configured to permit access to said first register if a privilege level input correlates to the privilege level assigned to the access region of that first register; and
   wherein said one or more registers are model specific registers.

2. The processor as recited in claim 1, wherein said validity check circuit includes a remapper configured to map said address of said first register to a local address identifying said first register within said one or more registers.

3. The processor of claim 1, wherein said plurality of access regions comprise:
   a first region including one or more registers that are only accessed when said privilege level corresponds to said processor being in a supervisory mode; and
   a second region including one or more registers that are accessed when said privilege level corresponds to said processor being in a user mode.

4. The processor of claim 3, wherein said validity check circuit further comprises a read/write input configured to indicate whether data is being read from or written to said registers.

5. The processor of claim 4, wherein said plurality of access regions further comprise a third region including one or more registers that are written to only when said privilege level corresponds to said processor being in said supervisory mode and are read from when said privilege level corresponds to said processor being in said user mode.

6. The processor of claim 1, wherein addresses of each of said one or more registers identify which of plurality of said access regions correspond to each of said registers.

7. The processor of claim 6 wherein said validity check circuit includes an address checker configured to verify that said addresses are within a valid address range.

8. The processor of claim 6, wherein most significant bits of said address of said first register identify which of said plurality of access regions corresponds to said first register.

9. The processor as recited in claim 8, wherein first combination of said most significant bits identifies a first access region of said plurality of access regions, and wherein said first access region has a fixed set of access attributes.

10. The processor as recited in claim 9, wherein said fixed set of access attributes includes read and write access to said first register for a first privilege level and no access for a second privilege level.

11. The processor as recited in claim 9, wherein said fixed set of access attributes includes read access to said first register for a first privilege level and a second privilege level and write access for said first privilege level but not said second privilege level.

12. The processor as recited in claim 9, wherein said fixed set of access attributes includes read and write access to said first register for a first privilege level and a second privilege level.

13. A method of controlling access to registers in an address space of a computer system, the method comprising:
   allocating registers to access regions of said address space, wherein each of said access regions is assigned a privilege level, and wherein said registers are model specific registers;
   receiving a privilege level input;
   receiving an address of a register, wherein said address identifies an access region to which said register is allocated;
   comparing said privilege level assigned to said access region identified by said address of said register to said privilege level input; and
   accessing said register if said privilege level assigned to said access region identified by said address of said register correlates to said privilege level input, wherein said register is a model specific register.

14. The method as recited in claim 13 further comprising receiving a read/write signal that indicates whether data is being written to or read from said registers.

15. The method as recited in claim 13 further comprising comparing said address to a valid address range.

16. The method as recited in claim 13 wherein said privilege levels include:
   a first level wherein access is permitted only when said privilege level input corresponds to said processor being in a supervisory mode; and
   a second level wherein access is permitted to a user when said privilege level input corresponds to said processor being in a user mode.

17. The method as recited in claim 13 further comprising mapping said address of said register to a local address identifying said register within said registers.

18. The method as recited in claim 13 wherein most significant bits of said address identify said access region and said privilege level.

19. The method as recited in claim 18, wherein a first combination of said most significant bits identifies a first access region of said plurality of access regions, and wherein said first access region has a fixed set of access attributes.

20. The method as recited in claim 19, wherein said fixed set of access attributes includes read and write access to said register for a first privilege level and no access for a second privilege level.

21. The method as recited in claim 19, wherein said fixed set of access attributes includes read access to said register for a first privilege level and a second privilege level and write access for said first privilege level but not said second privilege level.

22. The method as recited in claim 19, wherein said fixed set of access attributes includes read and write access to said register for a first privilege level and a second privilege level.

23. A computer system comprising:

a microprocessor wherein said microprocessor includes:

one or more registers wherein each of said one or more registers is assigned to one of a plurality of access regions and each of said plurality of access regions is assigned a privilege level;

a validity check circuit configured to receive an address of a first register of said one or more registers, wherein said validity check circuit is configured to permit access to said first register if a privilege level input correlates to the privilege level assigned to the access region of that first register, wherein said registers are model specific registers;

a bus bridge coupled to said microprocessor;

a main memory coupled to said microprocessor; and an input/output device coupled to said bus bridge.

24. The computer system of claim 23 wherein said plurality of access regions comprise:

a first region including one or more registers that are only accessed when said microprocessor is in a supervisory mode; and a second region including one or more registers that are accessed when said microprocessor is in a user mode.

25. The computer system as recited in claim 23, wherein said validity check circuit includes a remapper configured to map said address of said first register to a local address identifying said first register within said one or more registers.

26. The computer system of claim 23 wherein addresses of said registers identify said access regions of said registers.

27. The computer system of claim 26, wherein said validity check circuit includes an address checker configured to verify said addresses are within a valid address range.

28. The computer system of claim 26 wherein most significant bits of said addresses identify said access regions.

29. The computer system as recited in claim 28, wherein a first combination of said most significant bits identifies a first access region of said plurality of access regions, and wherein said first access region has a fixed set of access attributes.

30. The computer system as recited in claim 29, wherein said fixed set of access attributes includes read and write access to said first register for a first privilege level and no access for a second privilege level.

31. The computer system as recited in claim 29, wherein said fixed set of access attributes includes read access to said first register for a first privilege level and a second privilege level and write access for said first privilege level but not said second privilege level.

32. The computer system as recited in claim 29, wherein said fixed set of access attributes includes read and write access to said first register for a first privilege level and a second privilege level.

* * * * *

UNITED STATES PATENT AND TRADEMARK OFFICE
CERTIFICATE OF CORRECTION

PATENT NO. : 6,154,818
DATED : November 28, 2000
INVENTOR(S) : David S. Christie It is certified that error appears in the above-identified patent and that said Letters Patent is hereby corrected as shown below:

In the Claims:
Claim 9, column 18,
Line 4, between "wherein" and "first", please insert -- a --.

Signed and Sealed this

Twenty fifth Day of September, 2001

Attest:

NICHOLAS P. GODICI
Attesting Officer  Acting Director of the United States Patent and Trademark Office